United States Patent Office 3,108,083
Patented Oct. 22, 1963

3,108,083
COMPOSITION COMPRISING POLYESTER PHENOL FORMALDEHYDE RESIN AND ALDEHYDE CONDENSATE OF UREA MELAMINE OR ACETONE AND METAL SURFACE COATED THEREWITH
Deno Laganis, Schenectady, N.Y., assignor to Schenectady Chemicals, Inc., a corporation of New York
No Drawing. Filed Oct. 3, 1960, Ser. No. 59,818
9 Claims. (Cl. 260—14)

The present invention relates to the preparation of polyesters and protective coating compositions.

It is known to prepare protective coatings for metals using oleoresinous varnishes and epoxy resins. Such coatings, however, do not have as high a degree of heat resistance as is desirable in many cases.

It is an object of the present invention to prepare new polyesters.

Another object is to provide improved polyester protective coatings utilizing aromatic tricarboxylic acids as an esterifying ingredient.

A further object is to prepare improved polyester protective coatings for metals with superior heat and chemical resistance properties.

An additional object is to prepare aqueous polyester coating compositions which have improved wetting and flow characteristics as well as improved film continuity upon application to a metal surface.

A further object is to prepare a novel mixture of a water soluble polyester resin, a water soluble phenol-formaldehyde and a water soluble aminoplast.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are attained by mixing together (1) a water soluble polyester which is a condensation product of (a) a tribasic acid from the group of trimellitic acid, trimellitic anhydride, di-trimellitic anhydride, trimesic acid or hemimellitic acid, (b) a saturated aliphatic dicarboxylic acid such as adipic acid, azelaic acid, sebacic acid, malonic acid, succinic acid, glutaric acid, pimelic acid and suberic acid, and (c) a saturated aliphatic dihydric alcohol such as ethylene glycol, propylene glycol, 1,3-butylene glycol, trimethylene glycol, 2,2-diethyl propanediol-1,3, neopentyl glycol and hexyleneglycol; (2) a water soluble phenol-formaldehyde resin and (3) a water soluble aminoplast such as urea-formaldehyde and melamine-formaldehyde condensation products. Preferably both the phenol-formaldehyde and aminoplast are employed although either can be omited. In place of the aminoplast a ketone-aldehyde resin can be employed.

In preparing the polyester 10 to 90% of the total acids by weight are the tricarboxylic acids (including anhydrides) and the balance of the acids are the dibasic acids. Generally one to two equivalents of alcohol are utilized for each equivalent of total carboxylic acid groups available. The finished product has an acid number of 15 to 100, preferably from 32 to 63.

A portion of the aliphatic dihydric alcohol, up to 70% of the total alcohol present, can be replaced by an aromatic or hydroaromatic dihydric alcohol such as p-xylylene glycol, hydrogenated Bisphenol A and Dow 565 resin (1,1′-isopropylidene (p-phenyleneoxy) di-2-propanol).

The polyester is 40% to 99% of the total resin solids by weight based on ingredients (1), (2) and (3), preferred range is 60–90%.

The water soluble phenol-formaldehyde resin is 0 to 30%, preferably 10 to 20% of the total resin solids by weight based on ingredients (1), (2) and (3).

The water soluble aminoplast can be a methylol urea such as sesquimethylol urea, dimethylol urea, or a water soluble urea-formaldehyde resin, a water soluble etherified urea-formaldehyde resin, e.g. the methyl ether of a water soluble urea-formaldehyde reaction product or a methylol melamine, e.g. trimethylol melamine, hexamethylolmelamine, dimethylol melamine, etherified melamine formaldehyde condensation products, e.g. the trimethyl ether of trimethylolmelamine, the hexamethyl ether of hexamethylol melamine and water soluble melamine formaldehyde resin. The terms "water soluble urea formaldehyde condensation product" and "water soluble melamine formaldehyde condensation product" as used in the claims is intended to be generic to both the resins per se and the resin precursors, i.e. the methylol compounds, as well as being generic to the water-soluble etherified products.

The water soluble aminoplast is 0 to 30%, preferably 5 to 20% of the total resin solids by weight based on ingredients (1), (2) and (3).

To improve wetting, flow and film continuity it has been found desirable to add methyl cellulose (e.g. Methocel) and tall oil. The methyl cellulose (dry basis) should be used in an amount by weight of 1 to 10% of the total resin solids of (1), (2) and (3) and the tall oil should be employed in an amount of 0.5 to 5% by weight of the same resin solids.

The use of the methyl cellulose and tall oil improves the characteristics just mentioned to such an extent that eyeholing, cratering and pinholing are virtually eliminated when the composition is applied to metal, e.g. tinplate and aluminum.

The products of the present invention also have excellent adhesion to vinyl resins, e.g. vinyl chloride resins, and it is therefore possible to apply a polyvinyl chloride or a vinyl chloride-vinyl acetate copolymer coating, for example, on top of the metal coating of the instant invention.

The polyester resins employed in the following examples were prepared by heating trimellitic anhydride, adipic acid and the appropriate dihydric alcohol or alcohols to 135–190° C. until a check sample had the indicated acid number and viscosity utilizing water as the solvent.

Preferably the esterification is continued until the acid number is from 20 to 50 at 50% solids (or 40 to 100 at 100% solids). The pH of the polyester coating compositions containing ingredients (1), (2) and (3) is usually 7–10, preferably 8 to 9.5.

| | Ex. 1 | Ex. 2 | Ex. 3 | Ex. 4 | Ex. 5 | Ex. 6 |
|---|---|---|---|---|---|---|
| Trimellitic anhydride (grams) | 792 | 792 | 693 | 693 | 693 | 792 |
| Adipic acid (grams) | 202 | 202 | 177 | 177 | 177 | 202 |
| Propylene glycol (grams) | 750 | 574 | 574 | 488 | 488 | 702 |
| Neopentyl glycol (grams) | | 164 | | | | 164 |
| Dow 565 resin (grams) | | | 133 | | | |
| P-xylylene glycol (grams) | | | | 259 | | |
| Hydrogenated Bisphenol A (grams) | | | | | 443 | |
| Viscosity | Z-8 | Z-3-Z-4 | R | U-V | V | D-E |
| Solids (percent in water as solvent) | 50 | 34.5 | 18 | 33 | 19 | 37.5 |
| Acid No. (at 50% solids) | 32.6 | 33.6 | 37 | 63 | 36.9 | 33 |

All of the resins prepared in Examples 1–6 were suitable for incorporation with a water soluble aminoplast and a water soluble phenol formaldehyde resin to form the coating vehicle compositions of the present invention.

Typical coating compositions according to the present invention are given in the following examples in which all proportions are by weight.

|  | Ex. 7 | Ex. 8 | Ex. 9 | Ex. 10 |
|---|---|---|---|---|
| Aqueous polyester of Ex. 1 |  |  |  | 85 |
| Aqueous polyester of Ex. 2 | 85 | 92 | 90 |  |
| Aqueous phenol formaldehyde | 15 | 10 | 11 | 15 |
| Aqueous amine or Ketone formaldehyde | 10 | 8 | 10 |  |
| Methyl cellulose, 400 cps. (2½% aqueous solution) | 7.5 | 7.5 | 7.5 | 5 |
| Ammonia (28% aqueous) | 2.5 | 2.5 | 2.5 |  |
| Tall oil | 0.82 | 0.82 | 0.82 |  |
| Water | 10 | 10 | 10 | 10 |

The phenol formaldehyde employed was Bakelite BRL–1100 having a 64–68% solids content.

The amine formaldehyde employed in examples 7, 8, and 9 was Reichold's Super Beckamine 3560–65, a water soluble melamine-formaldehyde condensate having a 62–65% solids content.

*Example 11*

| | |
|---|---|
| Aqueous polyester of Ex. 2 | 90 |
| Aqueous phenol formaldehyde (Bakelite BRLA–1030, 64–68% solids) | 10.4 |
| Aqueous melamine-formaldehyde (Super Beckamine 3560–65) | 10 |
| Methyl cellulose, 400 cps. (2½% aqueous solution) | 7.5 |
| Tall oil | 0.82 |
| Ammonia (28% aqueous) | 2.5 |
| Water | 30.4 |

*Example 12*

| | |
|---|---|
| Aqueous polyester of Ex. 2 | 90 |
| Bakelite BRL–1100 | 11 |
| Beckamine P–468 | 9.3 |
| Methyl cellulose, 400 cps. (2½% aqueous solution) | 7.5 |
| Ammonia (28% aqueous) | 2.5 |
| Ricinoleic acid | 0.82 |
| Water | 10 |

Beckamine P–468 is a water soluble aceton-formaldehyde resin having a solids content of 68–72%.

*Example 13*

| | |
|---|---|
| Aqueous polyester of Ex. 1 | 90 |
| Bakelite BRL–1100 | 11 |
| Beckamine P–426 | 13 |
| Methyl cellulose, 400 cps. (2½% aqueous solution) | 7.5 |
| Methyl diethanolamine | 2.5 |
| Tall oil | 0.82 |
| Water | 27.4 |

Beckamine 426 is a water soluble urea formaldehyde resin having 48–52% solids content.

*Example 14*

| | |
|---|---|
| Aqueous polyester of Ex. 2 | 90 |
| Bakelite BRL–1100 | 11 |
| Beckamine P–426 | 13 |
| Methyl cellulose, 400 cps. (2½% aqueous solution) | 7.5 |
| Methyl diethanolamine | 2.5 |
| Tall oil | 0.82 |
| Water | 27.4 |

The coating compositions of Examples 7–14 were baked on tinplate at 400° F. for 10 minutes to give films of 0.1–0.3 mil thickness. There was no slivering of the films when the coated tinplate was punched out on the press.

The film thickness is generally such that the weight per 4 square inches is 8 to 15 milligrams and preferably 11–13 milligrams.

The baked finishes did not soften and there was no visible effect upon one boiling in water or upon 90 minutes in a pressure cooker at 250° F. and 15 p.s.i. There was no failure in the scorch test for 15 seconds at 740° F. In this respect the coatings were superior to conventional oleoresinous coatings and epoxy resin coatings which do not withstand 3 seconds at 740° F. in the scorch test.

The baked films also had excellent adherence to vinyl resins, e.g. vinyl chloride resins.

Unless otherwise indicated all parts and percentages are by weight.

The compositions of the present invention are particularly useful in coating metal cans in view of the properties set forth above and since they leave no after taste. However, they can be employed also to coat copper wires, vinyl plastic sheets, linoleum and other floor covering materials and wallpaper. Furthermore, they can be used to impregnate paper for making industrial filter paper and they can be used as a cork binder, etc.

What is claimed is:

1. A composition comprising (1) soluble resin consisting essentially of the polymeric ester of (a) 10 to 90% a member of the group consisting of trimellitic acid, hemimellitic acid and trimesic acid and (b) 90 to 10% of a saturated aliphatic dicarboxylic acid with (c) a diol selected from the group consisting of ethylene glycol, propylene glycol, 1,3-butylene glycol, trimethylene glycol, 2,2-diethyl propanediol-1,3-neopentyl glycol and hexylene glycol, (2) water soluble phenol formaldehyde resin and (3) a resin of the group consisting of water soluble melamine formaldehydes resins, water soluble urea formaldehyde resins and water soluble acetone formaldehyde, said phenol formaldehyde resin being 10 to 30% of the total resin solids, said resin of the group consisting of water soluble melamine formaldehyde resins, water soluble urea formaldehyde resins and water soluble acetone formaldehyde being from 5 to 30% of the total resin solids and said polyester being at least 40° of the total resin solids, said percentages being based on the weight of the total of ingredients (1), (2) and (3).

2. A resin according to claim 1 wherein the alkane dicarboxylic acid is adipic acid.

3. A composition according to claim 1 wherein the ingredient (3) resin is a water soluble melamine formaldehyde resin.

4. A composition according to claim 1 wherein the ingredient (3) resin is a water soluble urea formaldehyde resin.

5. A composition of matter according to claim 1 and also including methyl cellulose and tall oil dispersed in water.

6. A metal surface provided with a continuous coating of a heat insolubilized mixture of water soluble resins of claim 1.

7. A composition according to claim 1 wherein said diol consists of a mixture of neopentyl glycol and propylene glycol in which the propylene glycol is 77 to 81%.

8. A metal surface according to claim 6 wherein the ingredient (3) resin is amelamine formaldehyde resin.

9. A metal surface according to claim 6 wherein the mixture further includes methyl cellulose and tall oil.

References Cited in the file of this patent
UNITED STATES PATENTS

| | | |
|---|---|---|
| 2,494,810 | Hobday et al. | Jan. 17, 1950 |
| 2,562,878 | Blair | Aug. 7, 1951 |
| 2,939,857 | Bolton et al. | June 7, 1960 |
| 2,981,710 | Hoenel | Apr. 25, 1961 |

OTHER REFERENCES

Trimellitic Anhydride, published by Amoco Chemicals Corp., 1958, Chicago 80, Ill., 32 pages.